United States Patent
Sparrer et al.

(10) Patent No.: US 7,055,877 B2
(45) Date of Patent: Jun. 6, 2006

(54) PROTECTION DEVICE FOR A MOTOR VEHICLE INTERIOR

(75) Inventors: Henning Sparrer, Weilheim (DE);
Thomas Seeg, Ostfildern (DE);
Matthias Lechner, Munich (DE);
Siegfried Stoeckl, Pfeffenhausen (DE)

(73) Assignee: BOS GmbH & Co. KG, Ostfeldern (DE)

( * ) Notice: Subject to any disclaimer, the term of this patent is extended or adjusted under 35 U.S.C. 154(b) by 0 days.

(21) Appl. No.: 10/850,560

(22) Filed: May 20, 2004

(65) Prior Publication Data
US 2005/0012352 A1 Jan. 20, 2005

(30) Foreign Application Priority Data
May 21, 2003 (DE) ................. 103 24 289

(51) Int. Cl.
*B60R 7/00* (2006.01)

(52) U.S. Cl. ................. 296/24.43; 296/37.16

(58) Field of Classification Search ............. 296/24.34, 296/37.16
See application file for complete search history.

(56) References Cited

U.S. PATENT DOCUMENTS

| 4,252,362 | A | 2/1981 | Campbell |
| 5,711,568 | A * | 1/1998 | Diem et al. ............... 296/37.16 |
| 6,402,217 | B1 * | 6/2002 | Ament et al. ............. 296/37.16 |
| 6,416,103 | B1 | 7/2002 | Laudenbach et al. |
| 2002/0113450 | A1 | 8/2002 | De Gaillard |
| 2004/0232720 | A1 * | 11/2004 | Schlecht ................... 296/37.16 |

FOREIGN PATENT DOCUMENTS

| DE | 197 22 501 A1 | 12/1997 | |
| DE | 199 06 648 | 8/2000 | |
| EP | 0258823 | * 3/1998 | ............... 296/37.16 |
| EP | 0 976 615 | 2/2000 | |
| FR | 2 755 655 | 5/1998 | |

* cited by examiner

*Primary Examiner*—Dennis H. Pedder
(74) *Attorney, Agent, or Firm*—Flynn, Thiel, Boutell & Tanis, P.C.

(57) ABSTRACT

Protection device for a motor vehicle interior includes a flexible flat article that is movably mounted between a compact, deposited rest position and at least one extracted protection position through the use of a guidance device. The guidance device is designed so that the flat article can be moved between a first, roughly horizontally extracted protection position and a second, roughly vertically extracted protection position. The device is generally used in a luggage area of a vehicle.

21 Claims, 6 Drawing Sheets

PROTECTION DEVICE FOR A MOTOR VEHICLE INTERIOR

Figure 1:
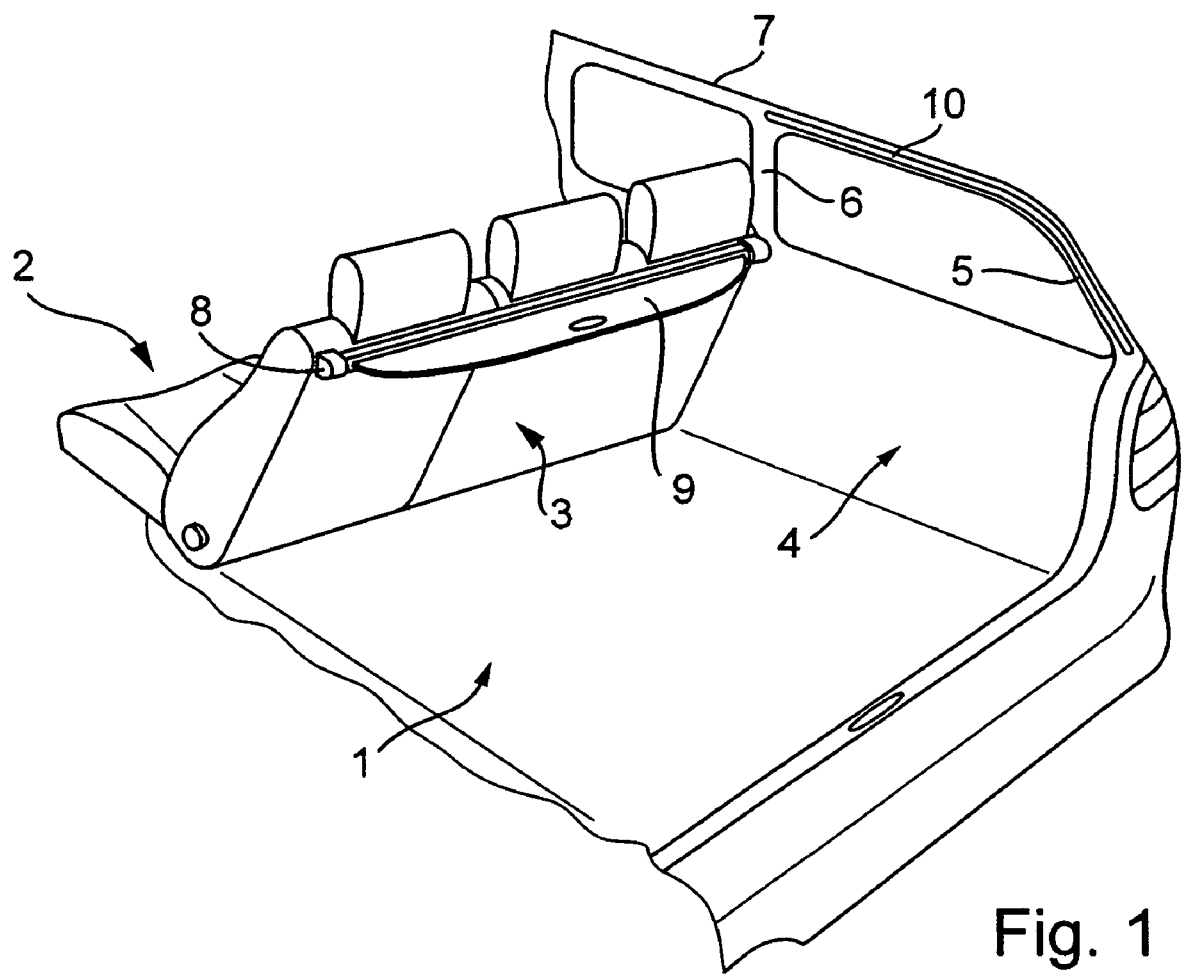

The invention relates to a protection device for a motor vehicle interior having a flexible flat structure or article, which is movably mounted between a compact, deposited rest position and at least one drawn out protection position by using guidance means.

Such a protection device in the form of a luggage or loading area or space cover is known from DE 199 44 948 C1. The known luggage area cover has a flexible flat structure, which is held so as to roll up and down on a winding shaft in a magazine casing. The magazine casing is positioned in the vicinity of a rear seat back arrangement. In a front end region in the extraction direction is provided a dimensionally stable extraction ledge extending over the width of the flat article and whose lateral ends project beyond the lateral edges of the flat article. The lateral ends of the extraction ledge are located in lateral guide rails of the luggage area in which are provided longitudinally displaceable drivers, which drive the lateral ends of the extraction ledge with limited force along the guide rails. The drivers are driven by an electric drive mechanism, the facing drivers preferably being synchronized with one another in order to bring about a parallel extraction or insertion movement of the extraction ledge and therefore the flat article. Thus, the flat article is movably mounted between a compactly wound up rest position integrated into the magazine casing and a protection position roughly horizontally covering a motor vehicle luggage area.

The problem of the invention is to provide a protection device of the aforementioned type by means of which it is possible using simple means to implement different protection states for the motor vehicle interior.

This problem is solved in that the guidance means are so designed that the flat article can be moved between a first, roughly horizontally extended protection position and a second, roughly vertically extended protection position. As a result of the solution according to the invention, the flat article serves both as a roughly horizontal luggage area cover and also as a roughly vertically oriented separating device. In the roughly horizontal luggage area covering function the flat article is preferably extracted or drawn out roughly level or just below a vehicle edge and covers the luggage area. In the separating device function the flat article is extracted or drawn out roughly vertically approximately up to a roof lining, so that a passenger area is separated from a luggage area within the interior. In the flat article luggage area covering function mainly a viewing protection is obtained, so as to prevent, from outside the vehicle, the viewing of the interior of the luggage area. Thus, it is not possible to see from the outside what is housed in the luggage area below the flat article. In said luggage area covering function the flat article is preferably designed in a view-tight manner. In the vertically fixed separating function the flat article is intended to prevent articles from being hurled out of the luggage area into the passenger area, particularly if there is a pronounced vehicle deceleration. Consequently the flat article has a retention function for articles in the luggage area. In the roughly vertically extracted protection position the flat article is preferably light-transmitting in such a way that when a driver looks in the rear-view mirror he can observe through the fixed flat article what is happening behind the vehicle and in particular the traffic travelling behind him. The flat article is for this purpose preferably made from a woven or knitted product, which has a net or lattice-like design in such a way that on viewing the fixed flat article under an acute angle the flat article appears largely opaque, whereas when looking through under a right angle to the fixed flat article surface it is possible to see through the same. In the horizontal luggage area covering function, looking from outside the vehicle into the interior of the latter and which is necessarily at an acute angle with respect to the flat article, it is not possible to look through the said flat article. Thus, it is possible to ensure the desired viewing protection in the luggage area covering function.

According to a development of the invention, fixing means are provided for arresting the flat article in the particular protection position. The fixing means serve to retain the flat article in the roughly vertical or roughly horizontal protection position. The fixing means can also be constructed in such a way that the flat article remains tightly positioned even when objects are inserted in said flat article. This is particularly advantageous if the flat article in the roughly vertically fixed protection position provides a retention protection for objects hurled out of the luggage area towards the passenger area. The fixing means limit the flat article deflection path, so that said flat article is kept substantially tight. Thus, when heavy articles are inserted into the flat article, there is only a relatively limited deformation and bulging of said flat article, so that persons on the back seat cannot be injured by objects hurled forwards from the luggage area.

According to a further development of the invention, the guidance means have a linear guidance arrangement, which on opposite vehicle sides has mutually parallel, linear and/or curved guidance profilings. Preferably the facing guidance profilings run along corresponding vehicle columns of the body support structure to a roof frame area and further along the particular roof frame area in the vehicle longitudinal direction. Preferably the guidance profilings are anchored to the body support structure and are adapted to or integrated into an interior lining. Preferably the guidance profilings are formed by link guides, which are formed by guide rails adapted to the corresponding contour between the vehicle edge and a roof area. As guidance profilings are provided both hollow body profiles and raised profiles, so that the bearing elements are either mounted in slidelike manner on raised profiles in the form of profile rails or the like, or are inserted in profile receptacles, preferably in the form of grooves, and are longitudinally displaceable therein.

According to a further development of the invention, with the flat article is associated a return arrangement, which exerts on the flat article a retraction force in the direction of the compact rest position. Preferably the return arrangement is formed by a spring storage device or spring motor. This return arrangement is firstly used for moving back the flat article from a corresponding protection position into the rest position. The return arrangement is additionally used to exert on the flat structure in the protection position a return loading effect tightening or bracing said flat article.

According to a further development of the invention a front end region of the flat article at the front in the extraction direction is dimensionally stable at right angles to the extraction direction and has lateral bearing elements connected to the guidance profilings. The bearing elements are preferably slidable or rollable on or in the guidance profilings. Preferably the bearing elements and guidance profilings are so positively interconnected in at least end regions of the guidance profilings defining the flat article protection positions that loading occurring on the flat article as a result of a strong vehicle deceleration are absorbed without the bearing elements being separated from the guidance profilings. Thus, the bearing elements are held in or on the guidance profilings so that they cannot be torn out. This solution ensures that a crash security can be achieved for the flat article and therefore for the entire protection device.

According to a further development of the invention, in the vicinity of at least one protection position, a separating device is associated with the guidance means permitting a controlled release of the front end region from the guidance means. A corresponding control can take place manually by gripping the front end region or automatically by a suitable control device. The separating device can be constructed in different ways. It is in particular possible that when designing the guidance means as guidance profilings, at least one guidance profiling is so openly designed on at least one end region that a manual release of the front end region of the flat article, i.e. a release of the bearing elements from the corresponding guidance profiling is made possible. It is alternatively possible to provide separating devices, which are constructed in the manner of releasable closures. A release of the corresponding closures consequently necessarily leads to a release of the flat article from the guidance means. This is particularly advantageous if the flat article is not required and is to be transferred directly from a vertical protection position into the compact rest position without making the detour via the longitudinal displacement along the guidance means.

According to a further development of the invention, a drive mechanism is provided, which in at least one direction brings about a displacement of the front end region along the guidance profilings. Preferably, at least in the extraction direction, a corresponding drive is provided, which can be constructed mechanically, particularly as a spring storage device, electrically, pneumatically, hydraulically or in some other way. In particularly preferred manner the drive mechanism is in the form of a linear actuator associated with the guidance profilings and which acts on the front end regions of the flat article in at least one direction of the longitudinal extension of the guidance profilings.

According to a further development of the invention, a further flexible flat article is provided, which is roughly horizontally extractably positioned parallel to a horizontal extraction path of the first flat article and which is at least largely viewtight. This design is particularly advantageous when the first flat article is transferred into its roughly vertical protection position. Through the further flat article it is possible, despite the first flat article being transferred into its roughly vertical protection position, to bring about a viewing protection for objects located on the luggage area floor or positioned in some other way below a vehicle edge. As the further flat article is also extractable between a compact rest position and an extracted functional position, when needed it can be returned in space-saving manner to its compact rest position.

According to a further development of the invention, the further flat article is held on a winding shaft associated with a casing for receiving the first flat article, so that both flat articles are compactly juxtaposed. Preferably both flat articles are housed in a common casing. It is alternatively possible to place a second casing for the further flat article in the immediate vicinity of the casing for the first flat article.

According to a further development of the invention, the further flat article is mounted in the vicinity of the interior boundary surface facing the arrangement of the casing for the first flat article and can be extracted in the opposite direction to the first flat article extraction direction. The interior boundary surface is preferably a luggage area wall. This can be part of a fixed body portion or part of a movable body portion, particularly a tailgate.

Further advantages and features of the invention can be gathered from the following description of preferred embodiments of the invention, the claims and the attached drawings, wherein show:

FIG. 1 a first embodiment of a protection device according to the invention, in which a flat article is located in its compact, deposited rest position.

Figure 2:
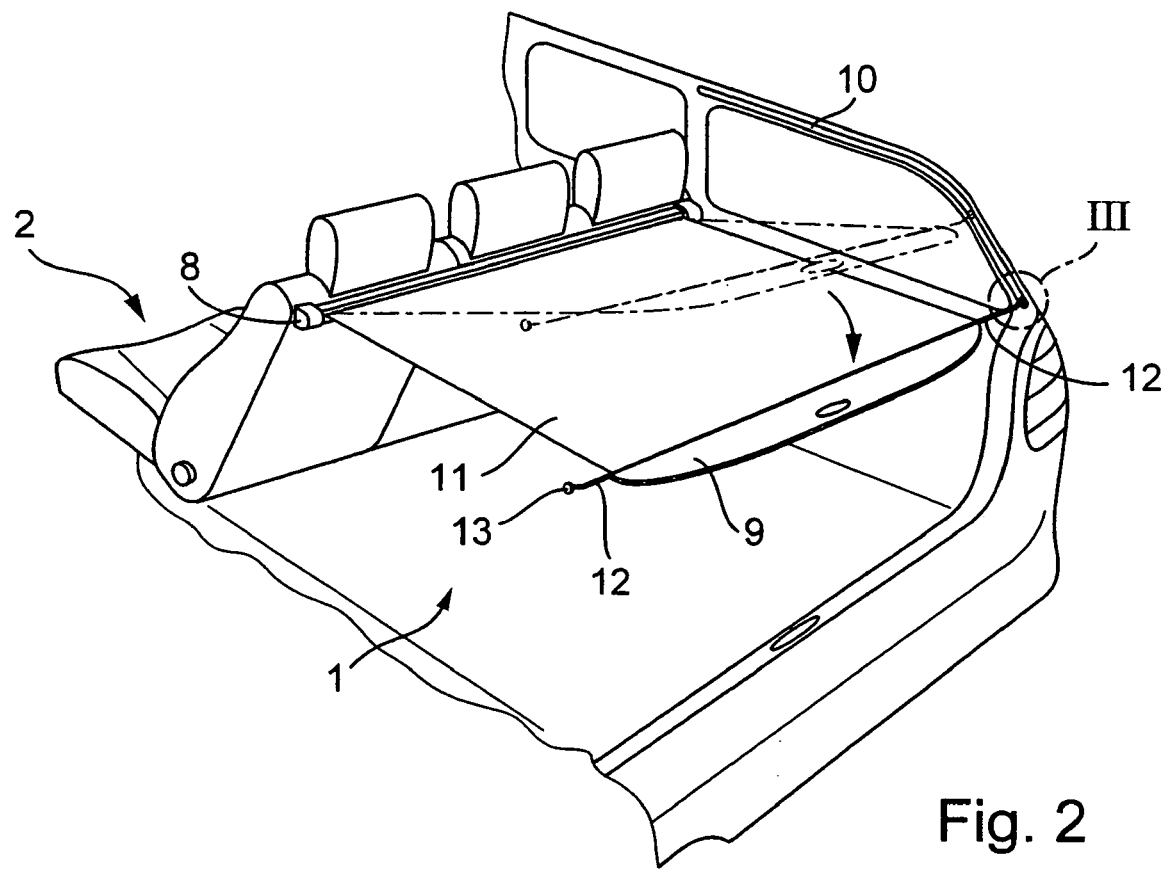

FIG. 2 The protection device according to FIG. 1, where the flat article is in a first protection position.

Figure 3:
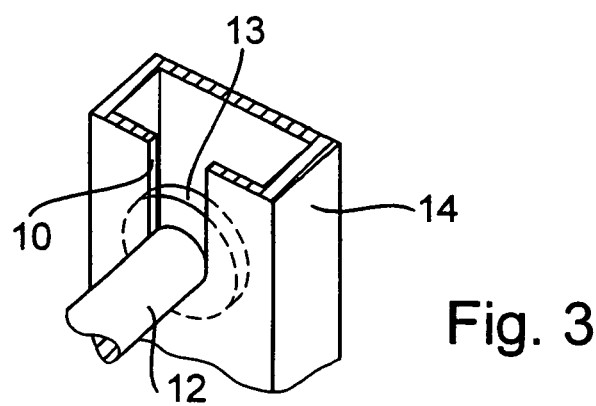

FIG. 3 A larger scale view of a detail III of a guide for the flat article according to FIG. 2.

Figure 4:
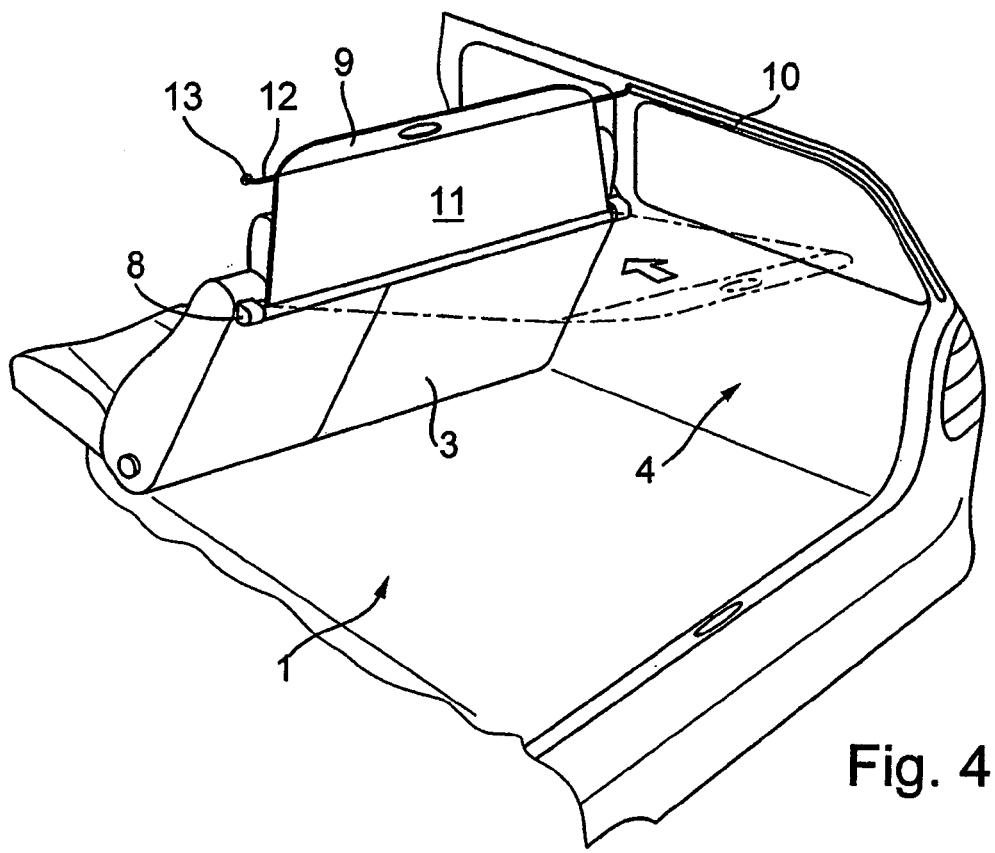

FIG. 4 The protection device according to FIG. 2, where the flat article is located in a roughly vertically fixed protection position.

Figure 5:
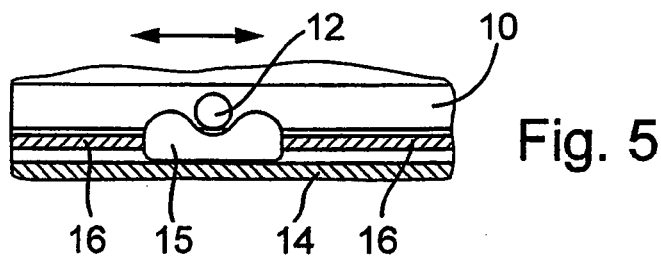

FIG. 5 In a larger scale view a detail of a lateral guide for the flat article.

Figure 6:
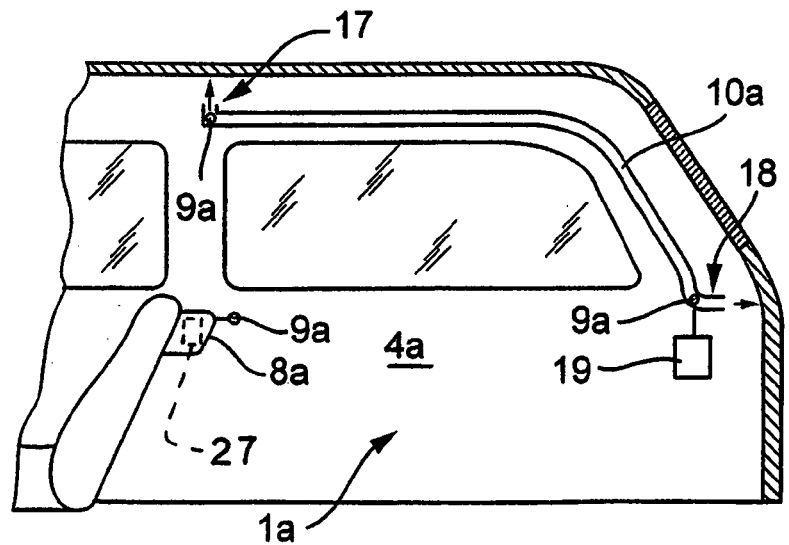

FIG. 6 Diagrammatically another embodiment of a protection device according to the invention with modified guidance means.

Figure 7:
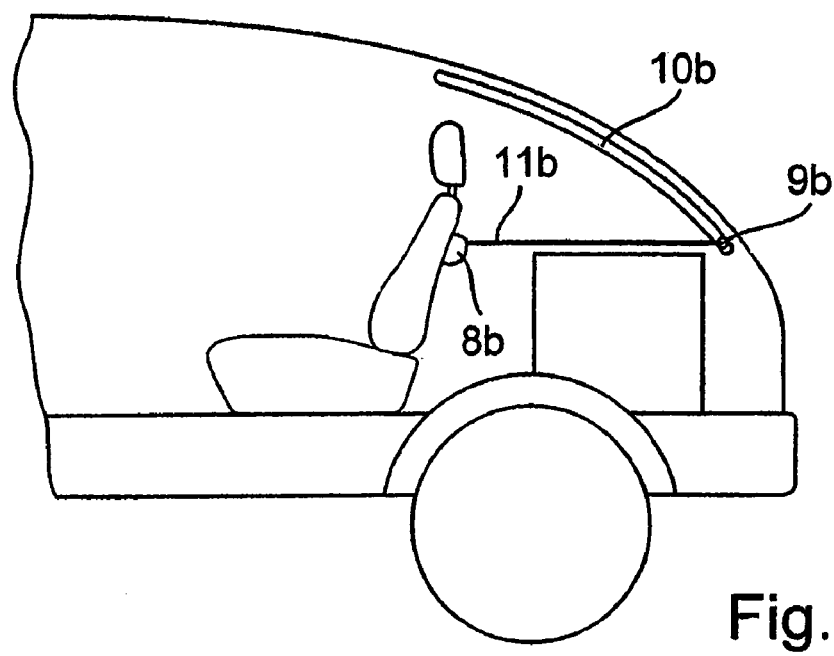

FIG. 7 Another embodiment of a protection device according to the invention for a car equipped with a progressive tail.

Figure 8:
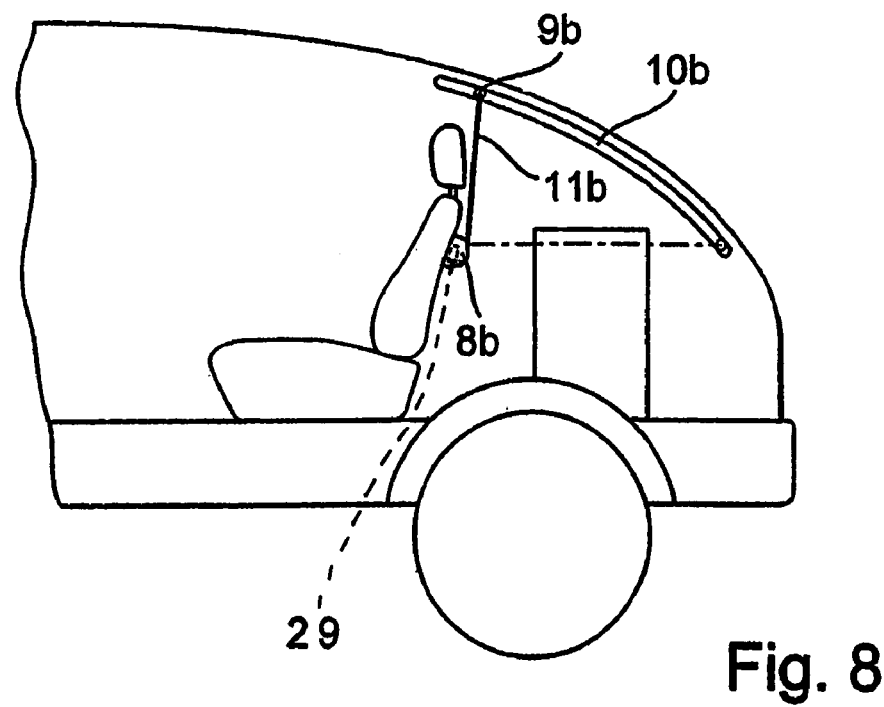

FIG. 8 The representation according to FIG. 7, in which the flat article is in a roughly vertically fixed protection position.

Figure 9:
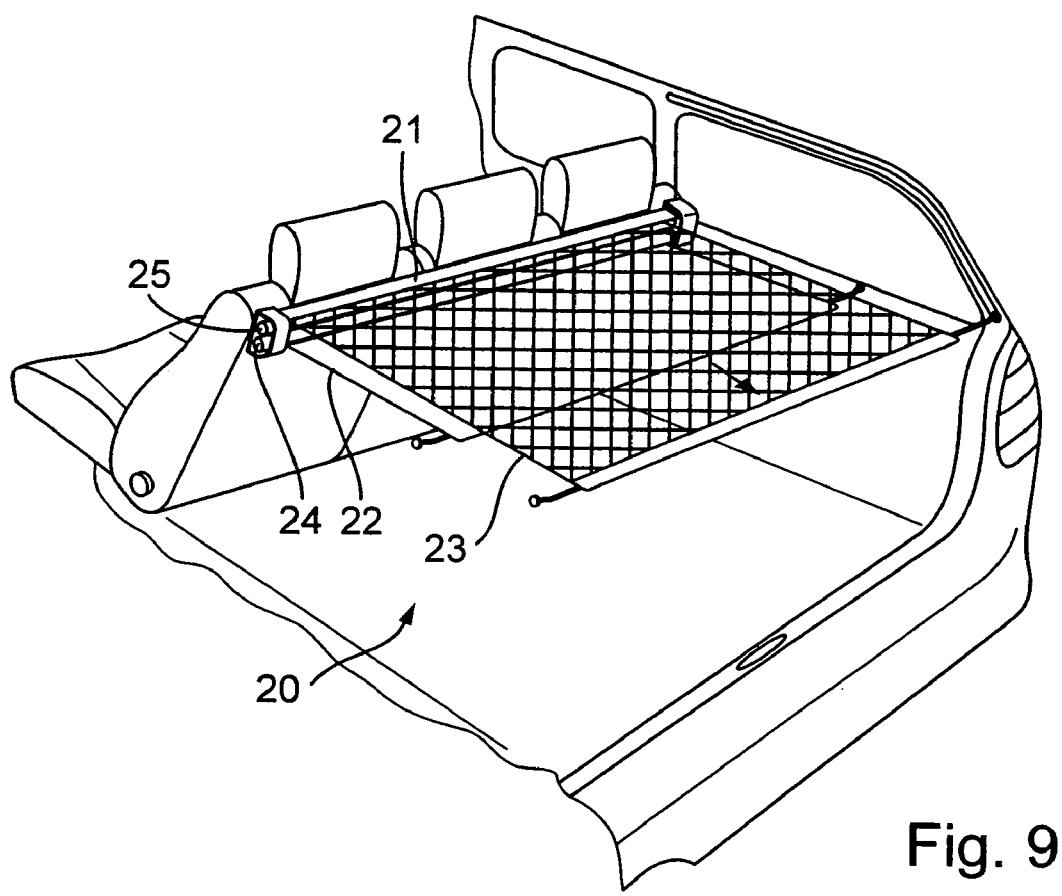

FIG. 9 A further embodiment of the protection device according to the invention in a perspective view.

Figure 10:
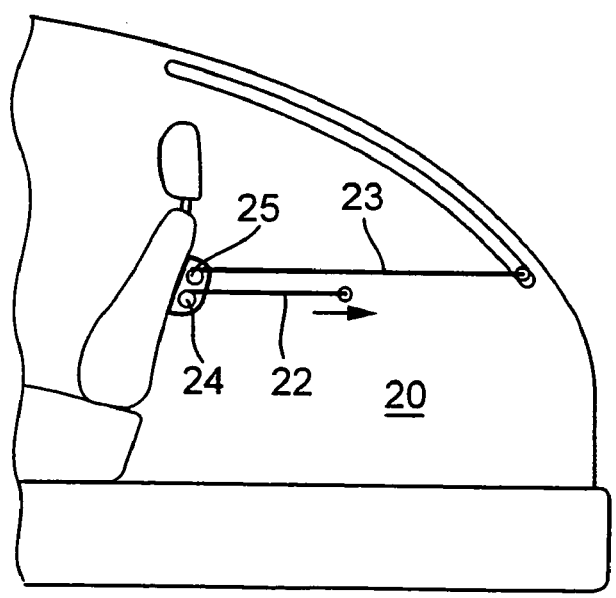

FIG. 10 The protection device according to FIG. 9 in a diagrammatic side view.

Figure 11:
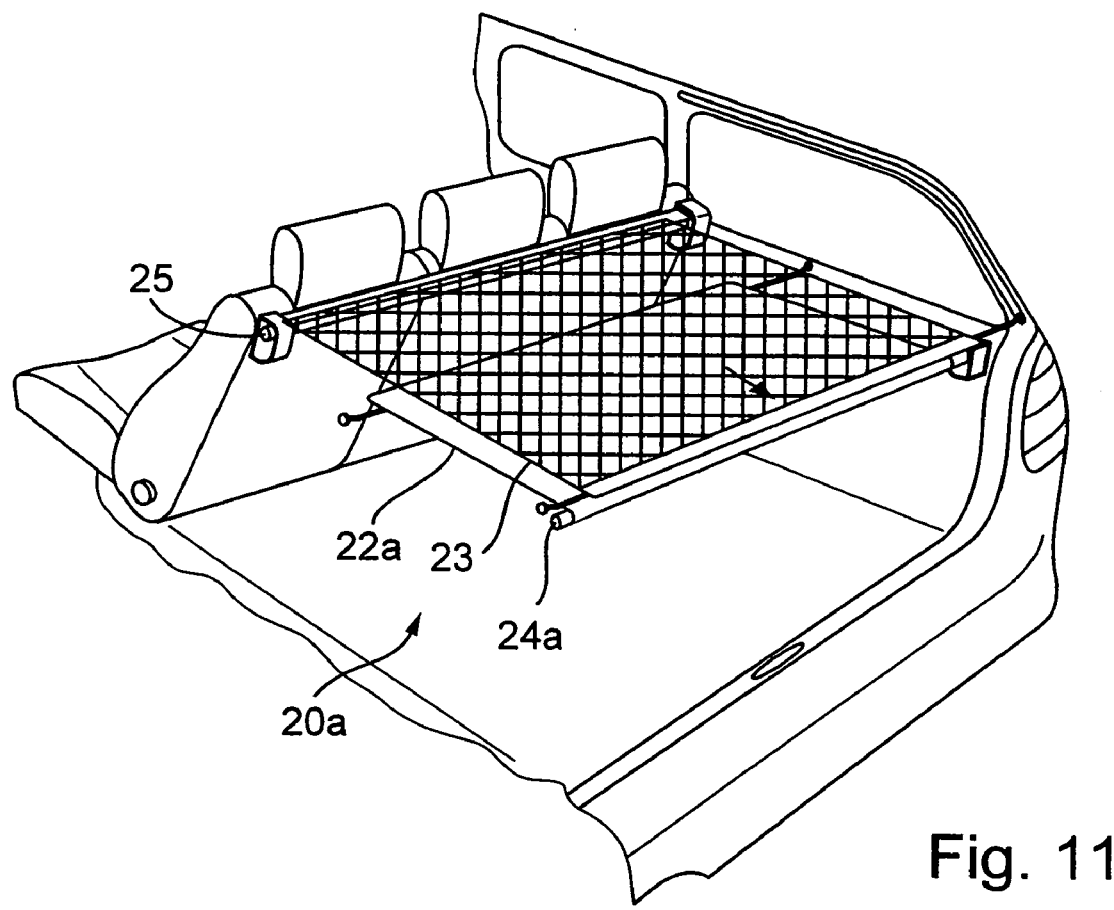

FIG. 11 Another embodiment of a protection device according to the invention, similar to FIG. 9.

Figure 12:
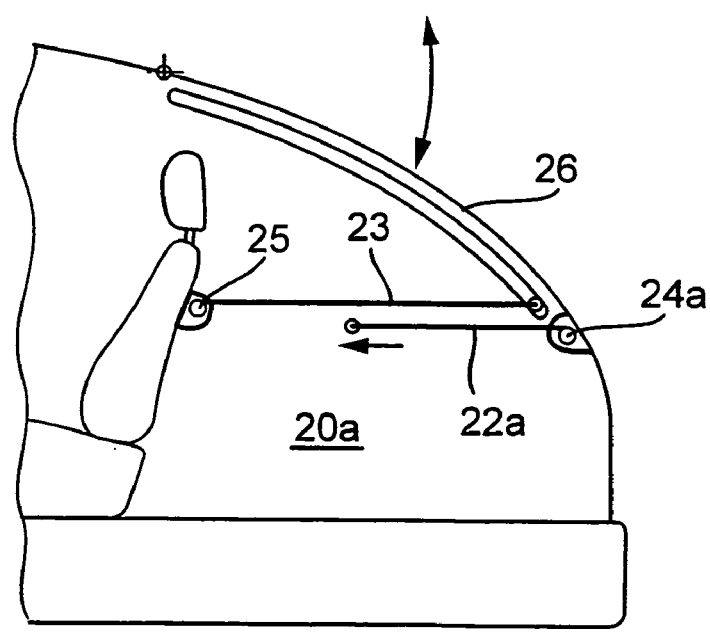

FIG. 12 The protection device of FIG. 11 in a diagrammatic side view.

According to FIGS. 1 to 4, a motor vehicle is constructed as a combi-vehicle, which has in a vehicle interior firstly a passenger area or compartment 2 and secondly a luggage or loading area or space 1. The luggage area 1 is located in the vehicle tail region and is accessible from the outside by means of a not shown tailgate. In the vehicle longitudinal direction, the luggage area 1 is forwardly bounded by a rear seat back arrangement 3. On facing vehicle sides is in each case provided a side wall 4, which laterally bound the luggage area 1. Each side wall 4 is closed roughly up to the level of a vehicle edge, i.e. roughly to the level of lower edges of window cutouts and starting from the luggage area floor and is preferably provided with corresponding inner lining parts. Above the vehicle edge the window cutouts are flanked by corresponding body column portions 5, 6, which pass into a roof frame area 7. The supporting column portions 5, 6 and roof frame area 7 are parts of a not shown body support structure, which are covered in the vicinity of the vehicle interior by corresponding, not further designated linings.

In the vicinity of a rear side of the seat back arrangement 3 and just below the vehicle edge is located a magazine casing 8 of a protection device for the luggage area 1, which is preferably detachably fixed either directly to the seat back arrangement or to the side walls 4. In fundamentally known manner, a winding shaft is mounted in rotary manner in the magazine casing 8 and on it is held an upwardly and downwardly rollable, flexible flat structure or article 11 (FIG. 2). The flat article 11 is led out of the magazine casing 8 through a not shown slot therein. The magazine casing extends over virtually the entire width of the luggage area 1.

Correspondingly the flat article 11 extends roughly over the entire width of the luggage area 1. In its compact, remote rest position the flat article 11 is rolled entirely onto the winding shaft. In said rest position only a front end region 9 of the flat article 11 projects out of the slot of the magazine casing 8. The front end region 9 extends over the entire width of the flat article 11 and has a dimensionally stable construction. The front end region 9 has a dimensionally stable extraction ledge 12 extending transversely over the entire width of the flat article 11 and which projects with its facing front ends in each case laterally over the particular lateral edge of the flat article 11. Each front end is provided with a subsequently described bearing element 13.

The flat article 11 is extractable both in a roughly horizontal protection position shown in FIG. 2 and a roughly vertically fixed protection position shown in FIG. 4. In a fundamentally known manner the winding shaft is rotary-loaded in the winding direction of the flat article 11 by a return arrangement 29 illustrated in FIG. 8 that is integrated into the magazine casing 8 and preferably a return spring, so that a corresponding return force of the return arrangement 29 keeps the flat article 11 tight in both protection positions. In addition, a fixing device 27 illustrated in FIG. 6 is provided in the magazine casing, at least for the roughly vertically fixed protection position of the flat article 11 and this is already used in known separation nets. This fixing or blocking device 27 secures the flat article in the case of a strong vehicle deceleration or when heavy objects enter the flat article counter to an extraction process. This in particular prevents a jerky or sudden extraction of the flat article. Preferably the blocking device 27 is active solely in the vertical, but not in the roughly horizontal protection position of the flat article 11.

The flat article 11 is made from a textile woven or knitted fabric material, which has a net or lattice-like construction in such a way that the flat article 11 in the case of a sloping viewing angle, particularly an acute viewing angle between 0 and 60ø, is view-tight. On viewing through the fixed flat article 11 under a right angle, i.e. at an angle of approximately 90ø, the flat article 11 is light-transmitting. Thus, in its roughly vertical, fixed protection position according to FIG. 4, the flat article 11 allows a through-view for a vehicle driver, should the latter e.g. wish to observe through a rear-view mirror traffic travelling behind him.

The flat article 11 is held in lateral guidance profilings 10 by its front end region 9 and particularly the extraction ledge 12 and bearing elements 13. The guidance profilings 10 are designed as guide rails 14 in the form of hollow profiles, which in each case form a link guide 10 open to the vehicle interior. For the guidance of the front end region 9 and extraction ledge 12, on facing vehicle sides are provided two mutually parallel guide rails 14 connected firmly to the body support structure. Starting from the tail of the luggage area 1, each guide rail 14 has a first, upwardly sloping portion running along the tail-side support column portion 5. At a transition of the tail-side support column portion 5 into the roof frame portion 7 each guide rail is curved in order to follow the body-side transition. A further portion of each guide rail 14 extends along the roof frame portion 7 roughly to the level of a support column portion 6, belonging to the C-column and which is positioned roughly level with the rear seat back arrangement 3. In its holding position oriented in the vehicle transverse direction, the extraction ledge 12 can be moved along the link guide of both guide rails 14 (cf. also the dot-dash line representation in FIGS. 2 and 4). The roughly horizontal protection position of the flat article 11 (FIG. 2) and the roughly vertical protection position of the flat article 11 (FIG. 4) are defined and bounded by facing end positions of guide rails 14 and link guides 10. The extraction ledge 12 can be manually moved between the two protection positions in the said guide rails.

Alternatively and in accordance with FIG. 5, the extraction ledge 12 and consequently the flat article 11 can be displaced by a drive mechanism in the guide rails. The drive mechanism has the same or a similar design to the drive mechanism of DE 199 44 948 C1, so that reference is made to this prior art for further information thereon. Such a drive mechanism preferably has a drive motor, as provided with the reference numeral 19 in FIG. 6. The facing front ends of the extraction ledge 12 are held in each guide rail on a longitudinally movable driver 15, which can be moved along the link guide by tension and/or compression means 16 by operating the drive motor. This permits an automatic and forcibly controlled displacement of the flat article 11 into the in each case desired protection position. The drivers 15 can be designed in such a way that the extraction ledge 12 is releasable in force-dependent manner. Alternatively the drivers can secure and move along the extraction ledge in force-unlimited manner, so that no force-dependent release of the extraction ledge can take place. A release can only take place in a defined manner controlled by a separating device.

The front end region 9 is in the form of a dimensionally stable contour part designed in such a way that it follows a contour of an inside of the tailgate in order to bring about a flush termination. The contour part is also shaped in such a way that it is terminated substantially flush with a not shown roof lining over the entire length thereof in the vertical protection position of the flat article. Thus, in both protection positions there is a view-tight termination with the corresponding wall portion of the vehicle interior, i.e. particularly the inner lining of the tailgate for the roof lining.

In the vicinity of facing front ends of the extraction ledge 12, the bearing elements 13 are constructed in block-like or disk-like manner in such a way that they fulfil the function of sliding blocks within the link guides. In addition, they provide a positive retention in the guide rails 14, so that the extraction ledge 12 cannot slide inwards out of the link guides, i.e. towards the centre of the vehicle.

The embodiment of FIG. 6 largely corresponds to the embodiment described hereinbefore. The essential difference is that the front end region 9a of the flat article can be released in both the roughly horizontal protection position and in the roughly vertical protection position from the guide rails 10a. For this purpose and on facing front ends, with each guide rail is associated a separating device, here in the form of an open area 17, 18. Thus, the guide rails 10a are open at both end regions in the particular extraction direction of the flat article, i.e. counter to the return force brought about by the return arrangement, so that the front end region 9a can be released from the guide rails 10a. The opening of the open areas 17, 18 away from the magazine casing 8a in the in each case opposite direction ensures a secure positioning in the particular protection position. However, by an upward extraction (at open area 17) or a rearward extraction (at open area 18), it is still possible to bring about a separation of the front end region 9a and consequently the flat article 11 from the guide rails 10a and consequently from the guidance means. Thus, the flat article, including its front end region 9a, can be deposited in the compact rest position, in which the flat article is wound onto the winding shaft and integrated into the magazine casing 8a. Functionally identical parts or portions of the embodiment according to FIG. 6 are given the same reference numerals, but to which the latter "a" has been added.

The structure and function of the embodiment according to FIGS. 7 and 8 substantially correspond to the embodiment according to FIGS. 1 to 5. The sole difference is that here the protection device is not provided for a combi-car, but instead for a car with a progressive tail. The guide rails 10b are therefore made shorter in accordance with the much smaller luggage area and have a uniform curvature in their course between the vehicle edge and the roof lining area.

In the embodiment according to FIGS. 9 and 10, the structure and function of the protection device 23, 25 correspond to the constructions according to FIGS. 1 to 6, so that reference is made to the disclosure concerning the latter for further information. The essential difference in the embodiment according to FIGS. 9 and 10 is that the first flat article 23, which can be moved into a roughly horizontal or alternatively roughly vertical protection position by the guidance means much as in the description relative to FIGS. 1 to 6, is supplemented by a further flat article 22. The flat article 22 can be extracted into a roughly horizontal protection position in parallel below the flat article 23. The flexible flat article 22 is mounted so as to be upwardly and downwardly rollable with respect to a winding shaft mounted in the magazine casing 21 parallel to and below the winding shaft 25 of the first flat article 23. The further flat article 22 positioned below the first flat article 23, has in a tail region of the luggage area 20 holding receptacles in which can be temporarily fixed an extraction ledge of the flat article 22. The flat article 22 is designed in view-tight manner, whereas the first flat article 23 is constructed as a light-transmitting separating net. When the first flat article 23 is transferred into its vertical protection position, the further flat article 22 can be drawn out as a supplementary viewing protection for objects on the luggage area floor. In the same way the further flat article 22 can also be drawn out when the first flat article 23 is in its roughly horizontal protection position. Thus, due to the fact that the flat article 23 is solely constructed as a light-transmitting net structure, in the horizontal protection position there is only a retention function for objects on the luggage area floor, but no view protection function. The additional protection against viewing is provided by the further flat article 22. Due to the fact that the further flat article 22 is in the immediate vicinity of the first flat article 23, is extractable parallel thereto and fixable in the extracted state, no significantly increased space is required despite the double use of flat articles.

In the embodiment according to FIGS. 11 and 12 a design similar to FIGS. 9 and 10 is provided. Thus, for further explanation reference should be made to the disclosure concerning FIGS. 9 and 10 and also that concerning FIGS. 1 to 6. The essential difference in the embodiment according to FIGS. 11 and 12 is that here the view-tight, further flat article 22a is extractable in opposition to the extraction direction of the first flat article 23 (arrow direction in FIGS. 11 and 12). For this purpose the further flat article 22a is held on a winding shaft 24a, which is fixed in a tailgate 26 by means of corresponding holders or by means of a corresponding housing. The tailgate can be opened or closed in known manner in the direction of the double arrow. In the vicinity of a magazine casing housing the winding shaft 25 for the first flat article 23, are provided hang-in elements for the extraction ledge of the further flat article 22a. The flat article 22a is view-tight in the same way as flat article 22, so that the same advantages arise in the embodiment according to FIGS. 9 and 10. The length of the further flat article 22a is preferably such that in the extracted, i.e. hung-in state of the further flat article 22a, it is possible to open the tailgate. The flat article 22a is then extracted to such an extent that in spite of the hung-in state, it can participate in the opening movement of the tailgate 26. With the winding shaft 24a is associated a corresponding return spring, which when the tailgate is closed again automatically brings about a winding up and tensioning of the flat article 22a.

The invention claimed is:

1. Protection device for a motor vehicle interior having a flexible flat article movably mounted by a guidance apparatus between a compact, deposited rest position and at least one extracted protection position, wherein the guidance apparatus is designed in such a way that the flat article is selectively displaceable between a first, horizontally extracted protection position that prevents viewing of an area in the interior of a vehicle from outside of the vehicle and a second, vertically extracted protection position that prevents items from passing therethrough while being at least partly light transmissive to allow viewing therethrough.

2. Protection device according to claim 1, wherein a fixing apparatus is provided for selectively arresting the flat article in the vertically extracted protection position.

3. Protection device according to claim 1, wherein the guidance apparatus includes a guidance arrangement provided on opposite vehicle sides with mutually parallel, linear and/or curved guidance profilings.

4. Protection device according to claim 3, wherein the guidance profilings comprise link guides.

5. Protection device according to claim 3, wherein a front end region of the flat article which is located at the front in an extraction direction is dimensionally stable at right angles to the extraction direction and has lateral bearing elements which are connected to the guidance profilings.

6. Protection device according to claim 1, wherein a return arrangement is associated with the flat article exerting on the latter a return force towards the compact rest position.

7. Protection device according to claim 5, wherein the bearing elements and the guidance profilings are positively secured, at least in the horizontal and vertical protection positions of the flat article, that loads on the flat article caused by vehicle deceleration are absorbed without the bearing elements being separated from the guidance profilings.

8. Protection device according to claim 1, wherein the guidance apparatus is associated in the vicinity of at least one protection position with a separating device, which permits a controlled release of a front end region of the flat article from the guidance apparatus.

9. Protection device according to claim 8, wherein at least one guidance profiling at at least one end region thereof is open in such a way that the front end region of the flat article can be released from the guidance profiling of the guidance apparatus.

10. Protection device according to claim 3, comprising a drive mechanism, which in at least one direction brings about a displacement of a front end region of the flat article along the guidance profilings.

11. Protection device according to claim 10, wherein the drive mechanism comprises a linear actuator, which acts on the front end region of the flat article in both directions of a longitudinal extension of the guidance profilings.

12. Protection device according to claim 10, wherein the drive mechanism has a synchronizing device for the uniform, simultaneous driving of both sides of the front end region of the flat article.

13. Protection device according to claim 1, the flexible flat article comprising a first flat article, and wherein a second flexible flat article is provided that is horizontally extractably positioned parallel to the first horizontally extracted protection position of the first flat article and is at least substantially view-tight, the second flat article having a horizontal extraction path that is spaced below the first horizontally extracted protection position in the interior of the vehicle.

14. Protection device according to claim 13, wherein the second flat article is held on a winding shaft associated with a casing for receiving the first flat article.

15. Protection device according to claim 13, wherein the second flat article is mounted in the vicinity of an interior boundary surface facing the arrangement of the casing for the first flat article and is extractable in opposition to the extraction path of the first flat article.

16. Protection device according to claim 15, wherein the second flat article is mounted on a tailgate.

17. Protection device according to claim 1, wherein said flat article comprises one of a textile woven material and a fabric material constructed so that in a horizontal position at an acute viewing angle between 0° and 60° the flat article prevents viewing therethrough so that items stored in the vehicle interior are not viewable.

18. Protection device for a motor vehicle rear interior having sidewalls defining a loading area, comprising:
   a casing mounted to a rear seat back of the motor vehicle;
   an extractable flexible flat article supported inside the casing in a first unextracted rest position for enabling access to the loading area; and
   guidance members for guiding and supporting the flat article along an extraction path to a second horizontally extracted protection position that covers the loading area and prevents viewing thereof, and for guiding and supporting the flat article at a third vertically extracted protection position dividing the vehicle rear interior from a vehicle front interior whereby the flexible flat article prevents objects in the loading area in the vehicle rear interior from entering the vehicle front interior due to a sudden deceleration of the vehicle,
   wherein the flexible flat article is selectively placed in one of the first unextracted rest position, the second horizontally extracted protection position and the third vertically extracted protection position.

19. Protection device according to claim 18, wherein said flexible flat article comprises one of a textile woven material and a fabric material constructed so that at an angle of approximately 90 degrees in the vertically extracted protection position the flat article is at least partly light-transmissive, and in a horizontal position at an acute viewing angle the flat article prevents viewing therethrough so that the loading area is not viewable.

20. Protection device in a motor vehicle rear interior having sidewalls defining a loading area, comprising:
   a casing mounted to a rear seat back of the motor vehicle;
   a first extractable flexible flat article supported inside the casing in a first unextracted rest position for enabling access to the loading area;
   guidance members mounted to the sidewalls for guiding and supporting the first flexible flat article along a first extraction path to a second horizontally extracted protection position that covers the loading area and prevents viewing thereof, and for guiding and supporting the first flexible flat article along a second reverse extraction path to a third vertically extracted protection position dividing the vehicle rear interior from a vehicle front interior whereby the first extractable flat article prevents objects in the loading area from entering the vehicle front interior due to a sudden deceleration of the vehicle; and
   a second horizontally extractable flexible flat article spaced downwardly from the first extractable flexible flat article and supported in a retracted rest position, the second extractable flexible flat article being movable to a horizontally deployed protection position that covers the loading area to prevent viewing thereof when the first flexible flat article is in the first unextracted rest position or in the third vertically extracted protection position.

21. Protection device in a motor vehicle rear interior according to claim 20, wherein the second flexible flat article is extractable in a horizontal direction that is opposite to the extraction direction for the horizontally extracted protection position of the first flexible flat article.

* * * * *